United States Patent [19]

Goel

[11] Patent Number: 4,683,283
[45] Date of Patent: Jul. 28, 1987

[54] LATENT ACCELERATORS FOR EPOXIDE CURING

[75] Inventor: Anil B. Goel, Worthington, Ohio

[73] Assignee: Ashland Oil, Inc, Ashland, Ky.

[21] Appl. No.: 877,057

[22] Filed: Jun. 23, 1986

[51] Int. Cl.⁴ ............................................. C08G 59/68
[52] U.S. Cl. ....................................... 528/93; 528/111
[58] Field of Search ................................ 528/93, 111

[56] References Cited

U.S. PATENT DOCUMENTS

| | | | |
|---|---|---|---|
| 3,945,971 | 3/1976 | Harrison et al. | 528/93 |
| 4,102,862 | 7/1978 | Monte et al. | 528/93 X |
| 4,110,313 | 8/1978 | Schulze et al. | 528/93 X |
| 4,122,069 | 10/1978 | Meyer | 528/93 |

*Primary Examiner*—Earl Nielsen
*Attorney, Agent, or Firm*—John F. Jones

[57] ABSTRACT

An epoxide composition which is curable at a temperature in the range of from 25° C. to 200° C. which is composed of an epoxide resin, a phenol carbamate cure accelerator and an amine hardener is described.

12 Claims, No Drawings

LATENT ACCELERATORS FOR EPOXIDE CURING

This invention relates to a process for the delayed curing of epoxide resins with amine curing agents which involves the use of carbamates of aromatic alcohols as latent curing agents.

Many curing agents are known for epoxy resins, such as amines, anhydrides, mercaptans, etc. Each type of curing agent has advantages and disadvantages which make them advantageous or disadvantageous for use in certain types of applications. Accelerators are known for use along with each type of curing agent for epoxide resins. Known curing accelerators include inorganic and organic metal salts such as lithium chloride and stannous octoate; onium salts such as ammonium chloride, alkyl phosphonium halides, etc. and boron trifluoride complexes.

There is a need to develop curable epoxy resin compositions which cure very rapidly at moderately elevated temperatures and have very long open time (pot life) at room temperature in applications such as structural adhesives, coatings and in sheet molding compound (SMC) applications. The use of mono- and polycarbonates obtained from the reactions of phenolics with mono-, di- and polyisocyanates as latent heat curable accelerators has not been disclosed or suggested in the prior art.

I have discovered that the use of certain phenol-based carbamates obtainable from the reactions of phenolics (mono-, di- and polyphenolics) with polyisocyanates in the epoxy resin systems along with an amine hardener component provides the desired latent acceleration. Thus, heat curable compositions curable at temperatures in the range of from about 25° C. to 200° C., exhibiting improved thermal latency are obtained from epoxy compositions which are composed of (1) a polyepoxide, (2) an amine hardener containing primary, secondary and tertiary amino and amido-amine groups, and (3) a phenol carbamate. Preferably the phenol carbamate is added to the polyepoxide before the hardener is added to the curable mixture. The carbamates (blocked isocyanates) which show the latent acceleration include the reaction products of mono and polyphenolics and corresponding substituted phenolics with polyisocyanates. The carbamates useful in this invention contain one or more functional groups of the following type:

wherein Ar represents an aromatic hydrocarbon moiety having from 6 to 12 carbon atoms. The carbamates useful in this invention also may be obtained by reaction of aliphatic or aromatic amines with aromatic carbonates.

Carbamates which are particularly useful in this invention include the following representative members: products of phenol, substituted phelols and polyphenols such as Bis-phenol-A, resorcinol and the like, with aliphatic and aromatic mono- and polyisocyanates such as methylene bis(phenyl isocyanate), toluene diisocyanate, hexamethylene diisocyanate, isophoron diisocyanate and the like and the isocyanate prepolymers obtained by the reaction of a polyol with excess isocyanate (2 equivalents or more of isocyanate per hydroxy equivalent).

The polyepoxides useful in this invention can be monomeric or polymeric, saturated or unsaturated, aliphatic, cycloaliphatic, aromatic or heterocyclic, and they may be substituted if desired with other substituents besides the epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula

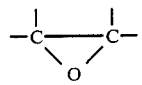

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-6,7,10,11-diepoxyhexadecane-1,16-dicarboxylic acid. Furthermore, there may be mentioned epoxidized mono-, di-, or polyesters, mono-, di- or polyacetals containing at least one cycloaliphatic 5-membered or 6-membered ring to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The aromatic carbamates may conveniently be used either by dissolving, blending or suspending them in the epoxy component in a two-component epoxy composition and may be used in amounts ranging from about 0.2 to 20% by weight based on the weight of the epoxide resin. Additives and diluents such as butadiene/acrylonitrile rubber, monoepoxides, lactones, organic carbonates and the like may also be included in the epoxy component.

The hardener component may consist of primary, secondary and tertiary amines, phenolics and optionally, other epoxy curing catalysts and promoters. Suitable amines may be aliphatic or aromatic amines and short or long chain amines with hydrocarbon, alkyl ether, etc. groups in the chain. The hardener component may contain medium and high molecular weight poly(alkylene oxide) di- or triprimary amine (molecular weight of from 200 to 10,000), an amido-amine obtained from the amidation reaction of a carboxylic acid terminated moledule with an alkylene di- or polyamine, a low molecular weight amine such as aminoethyl piperazine, bis-aminopropy piperazine, ethylene diamine and the like and mixtures thereof. The epoxy and hardener components may contain fillers pigments, metal oxides for induction curing, etc. if desired.

The cured polyepoxide materials embodied in this invention may be used in many applications such as for coatings, adhesives for metals, SMC, reinforced plastics, cement and the like and in the preparation of reinforced composite products such as laminated products, filament windings, molding powders, potting compounds and the like.

This invention is further illustrated in the following representative examples.

EXAMPLE 1

To 9.4 g of phenol in 100 ml of toluene was added 0.02 g of dibutyltin dilaurate followed by 14.5 g of liquid methylene bis(phenyl isocyanate). The reaction solution was stirred at room temperature under nitrogen. A white solid precipitated out of the solution. The mixture was stirred for 10 hours and filtered. The solid was washed with toluene followed by pentane and was dried in vacuum. The phenol carbamate product obtained in this manner was designated as accelerator "A" in the Table and in some of the following examples.

EXAMPLE 2

To 10 g of phenol in 90 ml of toluene was added 0.03 g of dibutyltin dilaurate and 9 g of hexamethylene diisocyanate. A white insoluble solid formed. The solid product was removed by filtration and was washed with toluene and pentane. The white powdered phenol carbamate was dried in vacuum and was designated accelerator "B" in the Table.

EXAMPLE 3

To 18.8 g of phenol in 180 ml of toluene was added 0.04 g of dibutyltin dilaurate followed by 17.4 g of toluene diisocyanate. The reaction solution was warmed to 50 degrees C. A white solid precipitated. The reaction was continued at 40-50 degrees C. for 10 hours and the solid was filtered, washed with toluene and pentane and dried in vacuum. The solid powder product was designated as accelerator "C" in the Table.

EXAMPLE 4

To 11.4 g of Bisphenol-A in 100 ml of toluene was added 0.02 g to dibutyltin dilaurate followed by 12 g of phenyl isocyanate. The reaction mixture was heated at about 40 degrees C. A white solid formed and was filtered and washed with toluene and pentane and was dried in vacuum. This product was designated as accelerator "D" in the Table.

EXAMPLE 5

The liquid diglycidyl ether of Bisphenol-A was blended with about 5% by weight of the accelerator of Example 3 at about 50 degrees C. The resulting liquid was kept at room temperature and the viscosity was monitored over a period of two weeks during which time no appreciable change in the viscosity was observed, indicating the excellent shelf stability of the mixture.

EXAMPLES 6–14

Several batches of liquid diglycidyl ether of Bisphenol-A resin (epoxy equivalent weight 180–190) were prepared by blending with them different levels of carbamate accelerators as shown in the following Table. These resins were then mixed with amine hardeners and the room temperature open time (pot life) and 100°–110° C. gel times were determined for each mixture. Results obtained are given in the following Table and they show latent acceleration for the materials embodied in this invention. Examples 6, 8 and 10 shown in the Table are given for comparative purposes and are outside the scope of the invention.

| No. | LDGEBPA (g) | Accelerator (g) | Hardener (g) | RT Open Time (Hours) | Elevated Temp. (°C.) | Gel Time (Min) |
|---|---|---|---|---|---|---|
| 6 | 7 | — | D400 (4) AEP (0.4) | >5 | 105 | 10 |
| 7 | 7 | 0.7A | D400 (4) AEP (0.4) | >5 | 105 | 3 |
| 8 | 10 | — | AEP (1.5) | >3 | 100 | 3.5 |
| 9 | 10 | 0.7A | AEP (1.5) | >3 | 100 | 2 |
| 10 | 10 | — | D400 (4.8) BAPP (1.2) | >4 | 110 | 3.7 |
| 11 | 10 | 0.5A | D400 (4.8) BAPP (1.2) | >4 | 110 | 1.7 |
| 12 | 10 | 0.35B | D400 (4.8) BAPP (1.2) | >4 | 110 | 2.25 |
| 13 | 10 | 0.35C | D400 (4.0) BAPP (1.0) | >4 | 110 | 1.6 |
| 14 | 10 | 0.4D | D400 (4.8) BAPP (1.2) | >4 | 110 | 2.2 |

LDGEBPA = Liquid Diglycidyl Ether of Bisphenol-A
D400 = poly(propylene oxide) primary diamine (molecular weight approx. 400)
AEP = Aminoethylpiperazine
BAPP = Bis-aminopropyl piperazine

EXAMPLE 15

An isocyanate containing phenol carbamate was prepared by reacting 17.4 g of toluene diisocyanate with 9.4 g of phenol in 60 ml of toluene in the presence of 0.01 g of dibutyltin dilaurate. The white powdered solid product showed infrared bands at about 2300 cm$^{-1}$ (isocyanate group), 3320 cm$^{-1}$ (carbamate NH) and 1700 cm$^{-1}$ (carbamate carbonyl group). A blend of 10 g of epoxy resin (liquid diglycidyl ether of Bisphenol-A) and 0.4 g of poly(propylene oxide) diamine (400 molecular weight) and 0.84 g of aminoethylpiperazine. This mixture gelled in about 3 minutes at 110° C. In comparison, a similar system having no carbamate in it gelled under the same conditions in about 6 minutes.

I claim:

1. A heat curable epoxide composition comprising an epoxide resin, a phenol carbamate accelerator and an amine hardener.

2. The composition of claim 1 wherein the phenol carbamate accelerator contains one or more functional groups of the type

wherein Ar represents an aromatic hydrocarbon moiety having from 6 to 12 carbon atoms.

3. The composition of claim 2 wherein the epoxide resin is a compound containing more than one group of the formula

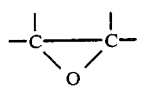

4. The composition of claim 3 wherein the amine hardener is composed of a poly(alkylene oxide) di- or triprimary amine having a molecular weight in the range of from 200 to 10,000, an amido amine obtained from the amidation of a carboxylic acid terminated molecule with an alkylene di- or polyamine, or a low molecular weight amine selected from the group consisting of aminoethyl piperazine, bis-aminopropyl piperazine and ethylene diamine and mixtures thereof.

5. The composition of claim 4 wherein the epoxide resin is a liquid diglycidyl ether of Bis-phenol-A.

6. The composition of claim 5 wherein the accelerator is the reaction product of phenol and methylene bis(phenyl isocyanate).

7. The composition of claim 5 wherein the accelerator is the reaction product of phenol and hexamethylene diisocyanate.

8. The composition of claim 5 wherein the accelerator is the reaction product of phenol and toluene diisocyanate.

9. The composition of claim 5 wherein the accelerator is the reaction product of Bisphenol-A and phenyl isocyanate.

10. The composition of claim 5 wherein the amine hardener is composed of poly(propylene oxide) primary diamine and aminoethyl piperazine.

11. The composition of claim 5 wherein the amine hardener is composed of poly(proplene oxide) primary diamine and bis-aminopropyl piperazine.

12. The process comprising curing the composition of claim 1 by heating it at a temperature in the range of from about 25° C. to 200° C.

* * * * *